Jan. 26, 1943.  D. KATZ  2,309,120
LECTURE AND PROJECTION DESK OF THE SCRIPTOSCOPE TYPE
Filed Nov. 24, 1939  2 Sheets-Sheet 1

David Katz.
INVENTOR

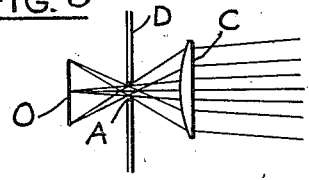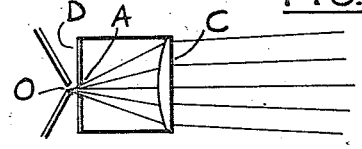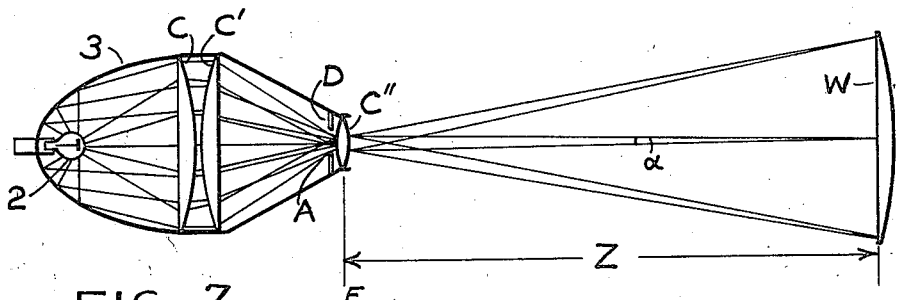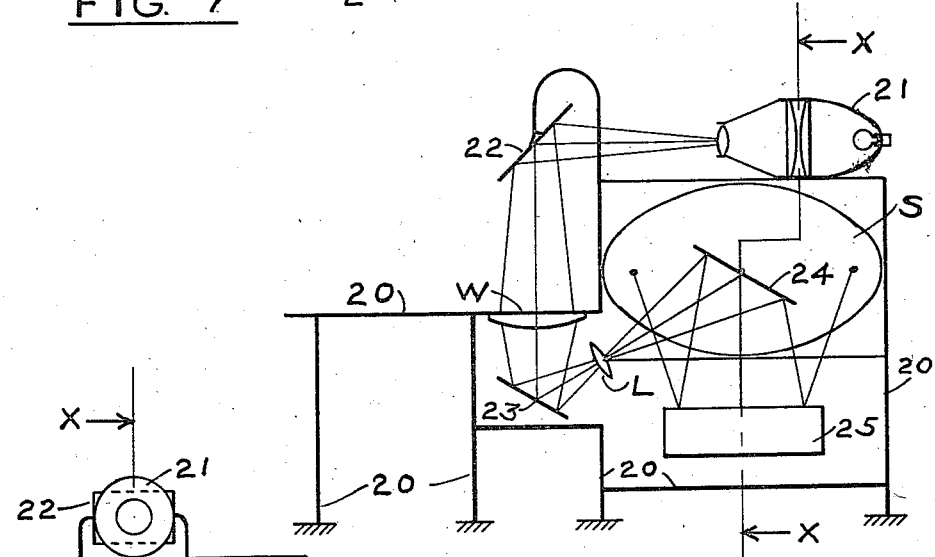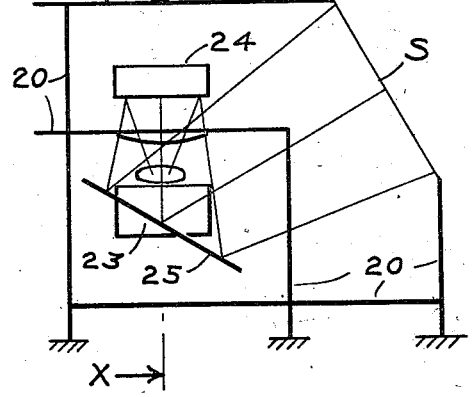

Patented Jan. 26, 1943

2,309,120

UNITED STATES PATENT OFFICE 2,309,120

LECTURE AND PROJECTION DESK OF THE "SCRIPTOSCOPE" TYPE

David Katz, Wilmington, Del., assignor to The Scriptoscope Company, Wilmington, Del., a corporation of Delaware Application November 24, 1939, Serial No. 305,864

1 Claim. (Cl. 88—24)

In my copending applications Serial Nos. 192,755 and 241,530, filed February 26 and November 21, 1938, (Pat. Nos. 2,181,133 and 2,181,134, respectively) I have described a novel lecture and projection desk which I named Scriptoscope. The characteristic of the Scriptoscope is that it combines the functions of a lecture desk and a projection device, whereby a lecturer may sit at the desk and write on top thereof at ease, while the writing is automatically and simultaneously being projected unto a substantially vertical screen built into the desk in full view of the audience which faces the lecturer.

My present application is a continuation-in-part of the aforesaid copending application Serial No. 192,755, which has become Patent No. 2,181,133, dated November 28, 1939, and relates to certain improvements in said Scriptoscope. More particularly, this application deals with the sharpness of definition of the projection on the said screen, and has for its object to provide ways and means for increasing said sharpness of definition. Other important objects will appear from the description which follows.

For a better understanding of this invention, reference is made to the accompanying drawings which constitute a part of this specification. In these drawings, Fig. 1 is a simplified diagram of the optical system of the Scriptoscope omitting, however, all mirrors, and rearranging the other units so as to enable the rays of light to travel generally in a horizontal direction to facilitate study thereof.

Figs. 5 and 6 are diagrammatic sectional representations of two improved illuminating systems according to this invention which overcome the problem of matted light by using a diaphragm and aperture.

Fig. 7 is a similar view of a further modification of the illuminating system according to this invention.

Figs. 8 and 9 are two diagrammatic vertical sections of one form of the Scriptoscope employing the illuminating system of Fig. 7, Fig. 8 being a section along line X—X of Fig. 9, and vice versa.

In all the figures, O is the source of illumination, for instance an electric arc or incandescent lamp; C is a condensing lens used in conjunction with the light rays emanating from O; W is a plano-convex lens serving as writing panel for the Scriptoscope; S is the projection screen displayed to the audience; L is the focussing lens, which projects upon S shadow-images of the writing done on W, and D is a diaphragm with aperture wherever employed.

Figure 1:
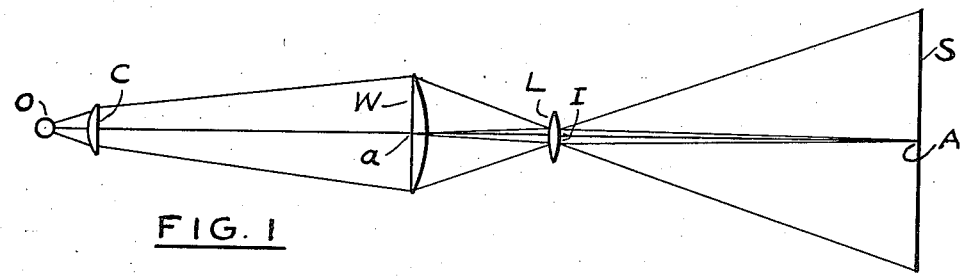

Now, as shown in Fig. 1, the optical system of the Scriptoscope may be considered as consisting of two overlapping focussing systems. In the one (the system O—C—W—I—S), light-rays originating in the illuminating source O are condensed successively through the lenses C and W (and L) and come to a focus at I, after which they spread out again into a cone and impinge upon the screen S, illuminating a large area thereon. In the other system (the system W—L—S), rays of shadow originating in points of opaque writing on the flat surface of W are condensed by lens L and focussed upon the screen S, producing thereon enlarged shadow images of said opaque points of writing.

In my parent application I have stated that the lens L may be placed in advance of the point of convergence I, at this point, or behind it. There is indeed little difference, insofar as the principal operation of the Scriptoscope is concerned.

Where, however, the Scriptoscope is to be used in a large hall, it is essential that the images on the screen be as sharply defined as possible. The sharper the images the greater the distance at which they can be read.

Figure 2:
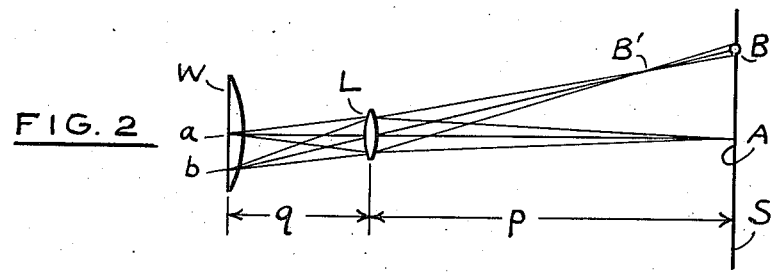
Fig. 2 is part of the same simplified diagram showing how the problem of depth of focus arises in the Scriptoscope and how it may affect the sharpness of definition of the projected characters on the screen, thus reducing the clearness of projection.

Now, it is known in the case of any focussing problem, that the simple lens suffers from various aberrations and comas the effect of which is to blur the image somewhat or "soften" it; that is, to decrease the sharpness of definition of the edges of the projected image. The principal aberrations in a system like W—L—S above are spherical aberration and depth of focus. The significance of the latter is explained by Fig. 2. In the triangle $aLb$, the distance $bL$ is greater than $aL$. Therefore, if lens L is placed so as to focus opaque point $a$ at point A on the screen, the rays from point $b$ will be focussed at some point B', far short of the screen, and will diverge from their hitting the screen at B but producing thereon a little disk of shadow instead of a point. This is due to the well known lens law $$\frac{1}{p}+\frac{1}{q}=\frac{1}{f}$$

where $q$ is the distance $aL$ or $bL$ while $p$ is the distance LA or LB' respectively.

In general practice, it is well known that aberrations of the above type and others are considerably helped by placing a diaphragm with an aperture (a "stop") in front of the lens L or behind it, thereby limiting the effective diameter of this lens. In the case of the Scriptoscope, however, such use of a diaphragm is of little utility, since the effective diameter of lens L is determined by the area of the cross section of the light-beam at the point where it is intercepted by the lens L.

However, the cross sectional area of the beam of light at point I is not infinitesimal, and has in fact a substantial value depending on the source of illumination employed. In other words, the cross section at point I is merely the brightly luminous image of the source of light O, and is, therefore, proportional to it in size. This is best explained in Fig. 3.

Figure 3:
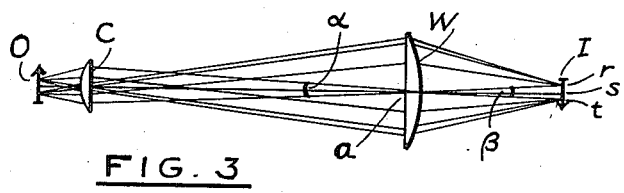
Fig. 3 is a diagram pertaining to the theory of my present invention, and shows how the light-rays from the illuminating source are criss-crossed or "matted" when a sizeable source of illumination is employed and how this effect may contribute toward poor definition of the projection.

In Fig. 3, the source of illumination O is represented by an arrow of substantial length. From the extreme points of this arrow rays of light are traced through the condensing lens C and writing panel W to the focussing zone I. It will be noted that the rays of light as they pass from C to W criss-cross each other and are "matted," so to speak. In passing from W to I, each point $a$ on the plane surface of W passes rays of light to every point $(r, s, t)$ of the image I. The latter has a finite length proportional to the length of O, in accordance with the well known law of images.

Figure 4:
Fig. 4 is a similar diagram showing how the light-rays are separated from each other or "combed," so to speak, when a point-source of light is employed, and how this may help increase the sharpness of definition of the projection.

In Fig. 4 an ideal case is represented wherein the light source is a geometrical point. In this case the image is likewise a point. The rays of light here in passing from C to W as well as W to I do not cross each other's path. They cannot be called parallel, because they diverge from C to W and converge from W to I. They cannot be designated as "stream-lined," because they are not curved. I have therefore selected the term "combed" as representing most accurately the state of affairs in Fig. 4. This term is to be contrasted with "matted" which represents the state of affairs in Fig. 3.

I have demonstrated by the above, that the blur of image due to depth of focus will be considerable whenever a state of affairs exists whereby each point $a$ on the surface of W will pass through itself a greatly divergent pencil of light rays. This state of affairs will exist whenever the writing panel W is flooded with matted light. It is a consequence of my theory that to obtain maximum sharpness of definition on the screen, the Scriptoscope should be illuminated with combed light.

It will be clear from the above discussion that one way to achieve substantially combed light is to use a lamp with a highly concentrated filament. An automobile headlight lamp, or a globe with a line filament placed so that it faces the lens C endwise are practical illustrations of such lamps. In such a case the use of reflectors should be avoided. The inner walls of the casing holding together the lamp and condenser C should be lined with light absorbing material.

In Figs. 5 and 6, approximate combing is achieved by the aid of a diaphragm D having an aperture A. The diaphragm can be used in two ways. In Fig. 5, a concentrated source of illumination is employed, such as an arc light. The diaphragm is placed close to the carbons, so as to exclude all of the halo and transmit light only from the crater of the hotter carbon. The source of light thus becomes virtually a point-source. In Fig. 6 a broad source of light is employed, for instance a line filament or ring in a plane parallel to the plane of condenser C. Here the diaphragm is placed midway between the filament and condenser. Because the aperture is very small, each point on the filament transmits light only to a small zone of condenser C, and when this is bent around and transmitted to W, the local angle of divergence will be relatively small.

A different mode of achieving sharpness of definition according to this invention is shown in Fig. 7. Here the light rays from lamp 2, with or without parabolic reflector 3, is first concentrated by the aid of condenser C—C' and brought to a focus at E before it is allowed to proceed toward the writing panel W. In order to reduce the spread of the beam as it leaves point E, a further concentrating lens C" may be placed at E, so chosen that the width of the beam shall just about cover the area of W without waste. Best results are obtained when lens C" is selected with the further view that it shall focus upon W an image of the plane face of lens C'; in this event, the field of light upon W is of very uniform intensity. If desired, a diaphragm D with aperture A may be used in front of lens C", to insure that only a narrow pencil of rays enters this condenser.

In this arrangement, it will be clear that the focus E acts like an aperture of small diameter, which may be further aided by the diaphragm D. Therefore, any pencil of light piercing the writing panel W at any given point $a$ cannot have an angle greater than is defined in radians by $$\frac{A}{Z}$$

where A is the diameter of the aperture or focal image at E, while Z is the distance from E to W.

It is possible that this is a major factor in the action of this system in increasing the sharpness of the projection upon the screen. However, I am not entirely clear on the theory of operation of this device, and do not wish to be limited by any particular theory. Whatever the true explanation be, I found by observation that the sharpness of definition of the projection upon the screen increases considerably when a three-lens illuminating system as in Fig. 7 here is substituted for the simple one-lens system described in my earlier patents. Now, it is known that a three-lens illuminating system like the one above may be employed for concentrating the light and for rendering the light uniform upon a film in motion-picture projection apparatus. But that it will have a beneficial effect on the sharpness of definition has, to my knowledge, not been observed or described in the art heretofore.

It will be understood that many modifications may be practiced with my invention above described without departing from the spirit thereof. For instance, in spite of my improvement in the illuminating system, the focussing lens L may still be replaced by a complex system of lenses, with or without diaphragm and aperture, and corrected to eliminate various other aberrations, if so desired.

Also, in all the above diagrams I have indicated, for simplicity, the trend of light as horizontal. In actual practice the writing panel W is substantially horizontal and the light has to enter it from above downwards. (Mirrors within the Scriptoscope change the direction of the light and adapt it for impinging upon the substantially vertical screen S.) The simplest form of execution, therefore, is to place the lighting system vertically above the writing panel, with the source of light squarely above the condensing lens C. But such arrangement is not absolutely necessary. The lamp-condenser system O—C may be placed in a convenient position to transmit a horizontal beam of light, and the latter may be intercepted and forced downwards into the writing panel by the aid of an inclined plane mirror. Or, the illuminating system may be attached to the side wall of the desk in a position to shoot the beam of light upwards, and the latter may then be directed into the writing panel from above by the aid of two inclined mirrors facing each other.

One arrangement of this sort is shown diagrammatically in Figs. 8 and 9, which represent two sections of a Scriptoscope having the projection screen partially elevated above the level of the desk top. In this diagram, 20 is the body of the desk including walls, legs, top and floor. The illuminating system 21 sends a horizontal beam of light into mirror 22 which throws it downward onto and through the writing panel W. From here the beam converges, strikes mirror 23, passes through focussing lens L, and upon emerging the beam begins to diverge and strikes mirror 24. The latter is parallel to mirror 23 and therefore redirects the beam downwards into mirror 25, which finally throws the beam forwardly and upwardly into the inclined projection screen S.

Related to the problem of sharpness of definition and the above proposed solution thereof is the possibility of parallax aberration due to the employment of thick mirrors. When light strikes a thick glass mirror obliquely, part of it will be reflected from the upper, glassy surface of the mirror and the remaining portion will be reflected from the silvered back of the mirror. The result is that each single light ray impinging is reflected as two separate and parallel light rays. Where sharpness of definition is desired, this aberration must be overcome.

The solution to this problem is to employ as thin glass mirrors as is possible to obtain. An alternative to this solution is to employ as mirror a metallic surface, for instance a chrome-plated sheet of steel, or a silver-coated or metal-backed sheet of Cellophane, Ethofoil, Pliofilm or similar cellulosic or latex transparent sheeting. For stiffness, the sheet may be backed by a sheet of wood, cardboard, metal, glass, etc.

Many other modifications and equivalents will be apparent to those skilled in this art.

I claim as my invention:

A projection apparatus of the Scriptoscope type comprising in combination a lecture desk, a transparent writing panel in the top of the desk, illuminating means adapted to send a beam of light through said writing panel into the interior of the desk, means associated with said writing panel for bringing said beam of light to a focus within the interior of the desk, focussing and reflecting means within the desk situated within the path of said beam of light and adapted to project said rays of light onto a shadow transmitting screen and to focus thereon rays of shadow originating in the writing panel, and further means associated with said illuminating means whereby to increase the sharpness of definition of the projection upon said screen, said further means comprising a system of condensers in close proximity to the source of light and adapted to converge the beam of light from said source to a focus at a point between said source and said writing panel but at a substantial distance from the latter, and comprising further a condensing lens situated within the path of said beam of light in proximity to said point of focus and adapted to concentrate the beam of light as it passes said point until it is just about sufficient to cover an area encircling said writing panel without substantial waste.

DAVID KATZ.